Sept. 25, 1923. 1,468,939
D. EUGSTER
COPYING APPARATUS
Filed Oct. 7, 1922 2 Sheets-Sheet 2
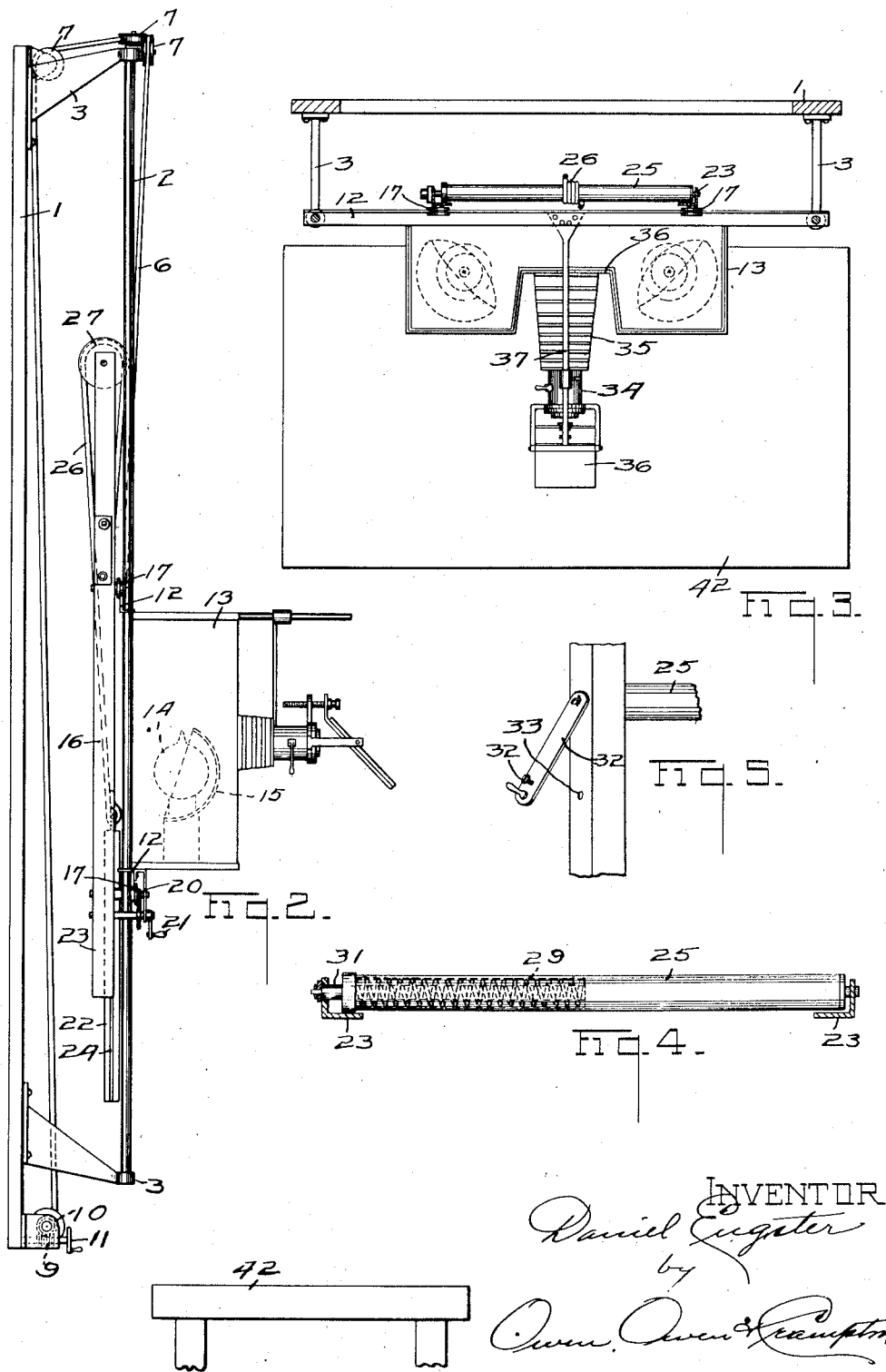

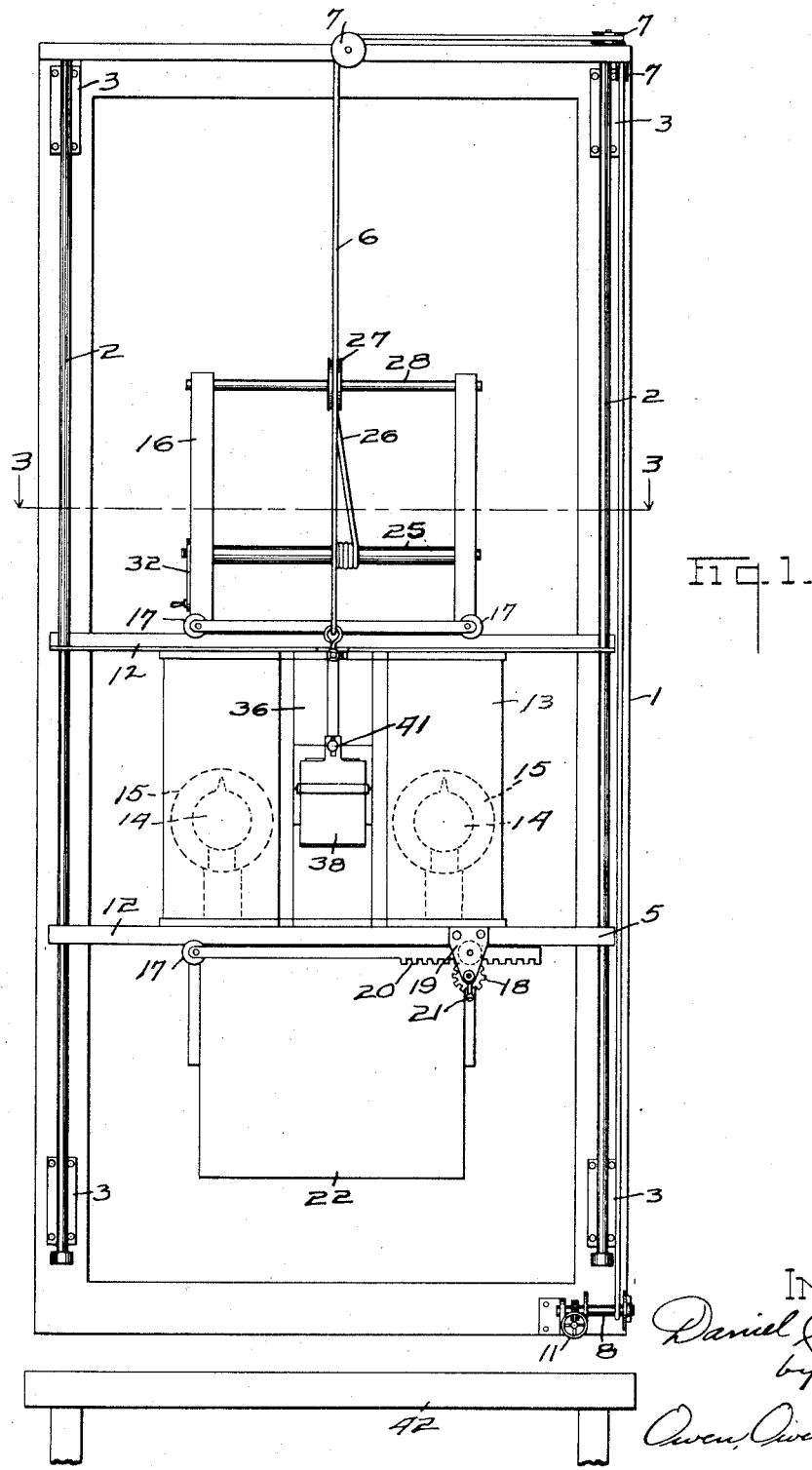

Patented Sept. 25, 1923.

1,468,939

UNITED STATES PATENT OFFICE.

DANIEL EUGSTER, OF UNION HILL, NEW JERSEY.

COPYING APPARATUS.

Application filed October 7, 1922. Serial No. 592,961.

*To all whom it may concern:*

Be it known that I, DANIEL EUGSTER, a citizen of the United States, and a resident of Union Hill, in the county of Hudson and State of New Jersey, have made an Invention Appertaining to a Copying Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an apparatus whereby the image of an object may be produced, and the outline thereof may be readily copied, either photographically or chemically, or by a manual or mechanical operated marking means.

The invention may be contained in structures of different forms. To illustrate a practical application of the invention I have selected a structure containing the invention and shall describe it hereinafter. The structure selected as an example of embodiments of my invention is shown in the accompanying drawings.

Figure 1 of the drawings illustrates a front view of the apparatus. Fig. 2 illustrates a side view of the apparatus. Fig. 3 illustrates a top view of part of the apparatus, and is a sectional view taken on the line 3—3 indicated in Fig. 1. Fig. 4 illustrates a balancing spring-operated roller whereby the apparatus may be easily adjusted in position. Fig. 5 illustrates a means for adjusting the tension of the spring of the roller.

In Figs. 1, 2 and 3. 1 is a frame that is provided with a pair of guide rods 2. The guide rods 2 are secured to the top and the bottom of the frame by means of suitable brackets 3. A frame 5 is movable along the rods 2 that operate to guide the frame in its vertical movements. A rope or cable 6 is connected to the frame 5 and passes over the pulleys 7 to the windlass 8. The windlass 8 may be operated by a suitable worm and worm gear 9 and 10. The worm is operated by the hand wheel 11 to rotate the shaft of the windlass 8 to raise the frame 5 or to permit it to be lowered. By reason of the worm and worm gear wheel connection between the hand wheel 11 and the windlass 8 the frame 5 will be held in any position to which it may be adjusted by the rotation of the hand wheel 11.

The frame 5 comprises two cross bars 12 and the container or box 13 which is connected to the cross bars 12. The container or box 13 forms chambers for directing the light from the electric lamps 14 towards one side of the chamber and preventing the escape of all rays of light that are directed to the other sides of the chamber. Reflectors 15 may be located behind the lamps to concentrate the light from each of the lamps upon any particular area of one side of the chamber in which the lamps are located. The reflectors 11 are so disposed as to condense or concentrate the light of the lamps over a common area located at a point slightly in front of the box.

A frame 16 is supported on the frame 5 and particularly on the cross bars 12. The frame 16 is provided with flanged rollers 17 that fit over the edges of the cross bars 12. The cross bars 12 are preferably formed of angle or L irons and thus they are provided with flanges that form bearing edges for the rollers 17 and also flanges through which the rods 2 extend. The lower cross bar 12 is provided with a pinion 18 which is supported in a bracket 19 connected to the lower cross bar 12. The frame 16 is provided with a rack 20 that meshes with the pinion 18. A crank handle 21 may be connected to the pinion to move the rack 20 relative to the bracket 19, and consequently to laterally adjust the frame 16 relative to the frame 5, binding of the frame 16 to the frame 5 being obviated by the rollers 17 that move over the edges of the flanged cross bar 12.

A frame or board 22 is movable vertically along the vertical bars 23 of the frame 16. The vertical bars 23 of the frame 16 may be formed of L bars and the vertical side edges of the board 22 may be provided with channels that loosely fit the inwardly extending flanges of the vertical bars 23 of the frame 16, whereby the board or frame 22 may be slid vertically along the bars 23 and guided by the flanges that fit into the channels 24. The board 22 may thus be slid to a point in front of the container 13 having the lighted chambers, and particularly to cover the area lighted in common by the light of the lamps 14 as directed by the reflectors 15.

The board 22 may be adjustably held in position by means of the spring operated counter balancing roller 25 which is rotatably secured in the frame 16. A cord or cable 26 is connected to the frame 22 and to the roller 25. It passes over the pulley 27 rotatably mounted on the cross bar 28 of the frame 16. The roller 25 is provided with a spring 29 that is adjustably wound or distorted from the normal by the crank arm 30 which is connected to the spring through the pin 31 in the same manner that a curtain roller, of the type well known in the art, is connected to the engaging supporting bracket located at one end of the curtain roller. The roller 25 is supported by the bars 23 and the crank arm 30 is provided with a screw 32 that may be threaded into the crank arm 30 and inserted in the hole 33 located in one of the bars 23. The board 22 will be held in any position to which it may be moved by the operation of the spring 29, which, together with the friction, counterbalances the weight of the board.

The box 13 is also provided with a suitable projecting lens contained in a cell 34 and an adjustable bellows 35 that is connected to one side of the box 13 and opens into a side portion 36 located at a point between the lamps and so that practically no light will pass directly from the lamp into the bellows. The side portion 36 of the box is located in front of the lighted area produced by the light of the lamps and the reflectors, whereby the light produced on the board 24 when placed in the lighted area will be received by the projecting lens contained in the cell 34.

The cell 34 is adjustably supported on a rod 37 that is secured by means of a bracket to the frame 12 or to the top of the box or container 13. A plane reflector 38 is supported in line with the axis of the condensing lens contained in the cell 34 so as to reflect the light received through the shell substantially at right angles to the axis of the shell. The reflector 38 is pivotally supported on a frame 39 which may be rotatably secured to the cell 34. The frame 39 is also provided with an ear 40 and the position of the reflector 38 may be adjustably secured by the threaded pin 41 that passes through the ear 40. Rotation of the pin 41 causes the reflector 38 to tilt and thus the angle of the reflector 38 may be readily adjusted.

A table 42 is located beneath the reflector 38 and so as to receive the light that passes through the cell 34. If, therefore, a design of any form is placed on the board 24 and the board is placed in the lighted area produced by the lamps 14, it will be reproduced by the projecting lens and the reflector 38 upon the table 42. If cloth or paper or any other sheet material is placed upon the table 42 the outline of the design may be marked and thus the design placed on the board may be copied. By proper adjustments of distances as between the lens and the board 24 and the distances between the cell and the table 42 the image produced on the table may be varied in size, whereby the design contained on the board may be enlarged as may be desired. The copies of the design may be obtained by any suitable means or process such as by the use of chemicals, if the light is of sufficient intensity and quality, or by manually marking the outline of the design.

I claim:

1. In a copying apparatus, a container, lamps located in the container for lighting the interior of the container, the light being confined by the container, a frame movable transversely relative to the container, a board movable vertically in the frame and for receiving the light from the lamps, an adjustable light projector located in front of the lighted area to receive the light from the board when the board is placed in the lighted area of the lamps, a table located below the light condenser, and a reflector for reflecting the light from the projector on the table, whereby the image of an object placed on the board is produced on the table.

2. In a copying apparatus, a frame, a container movable vertically along the said frame and having a source of light, the container operating to confine the rays of light, a second frame movable transversely relative to the container, a board supported in the second frame and movable vertically relative to the second frame and adapted to be placed in the lighted area produced by the source of light, a light projector located in front of the board and located in the lighted area, a reflector for reflecting the light from the projector, a table for receiving the light from the reflector whereby the image of an object placed on the board will be received on the table.

In testimony whereof, I have hereunto signed my name to this specification.

DANIEL EUGSTER.